United States Patent

Comer, Jr. et al.

[11] 3,841,715
[45] Oct. 15, 1974

[54] IDLER MOUNTING MECHANISM AND TRACK ADJUSTER

[75] Inventors: Glen S. Comer, Jr.; Ellis A. Sitton, both of Peoria, Ill.

[73] Assignee: Caterpillar Tractor Co., Peoria, Ill.

[22] Filed: Dec. 26, 1972

[21] Appl. No.: 318,517

[52] U.S. Cl. .................... 305/10, 305/30, 305/31
[51] Int. Cl. .................... B62d 55/10, B62d 55/30
[58] Field of Search ................ 305/10, 30, 31, 32; 92/168, 128

[56] References Cited
UNITED STATES PATENTS

| | | | |
|---|---|---|---|
| 1,511,695 | 10/1924 | Weitman | 92/168 |
| 2,506,619 | 5/1950 | Schwartz | 305/31 |
| 2,511,098 | 6/1950 | Bridwell | 305/30 |
| 2,716,577 | 8/1955 | Land | 305/10 |
| 2,818,311 | 12/1957 | Ashley | 305/10 |
| 2,887,342 | 5/1959 | Helsel | 305/10 |
| 2,899,938 | 8/1959 | Gardner | 92/168 |
| 3,153,539 | 10/1964 | Flick | 92/168 |
| 3,517,972 | 6/1970 | Williams | 305/10 |

Primary Examiner—Robert S. Ward, Jr.
Assistant Examiner—Reinhard J. Eisenzopf
Attorney, Agent, or Firm—Phillips, Moore, Weissenberger Lempio & Strabala

[57] ABSTRACT

An idler mounting mechanism for slidably supporting a rotatable idler on a track frame includes a shaft supporting the idler, with the ends of the shaft being supported by a slidable member. The slidable member includes a guide surface disposed substantially parallel to a top machine surface of the roller frame, and a hook-like member having a flange extending therefrom and slidably engaging a bottom machined surface of the roller frame.

6 Claims, 4 Drawing Figures

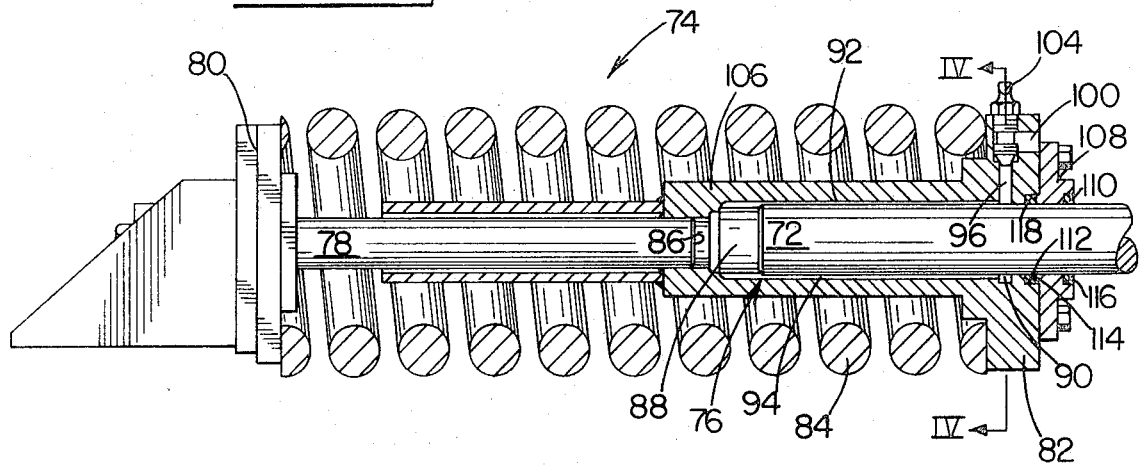
FIG-3-
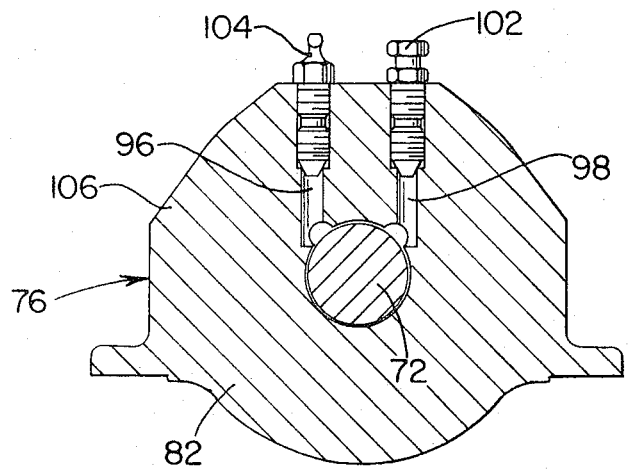
FIG-4-

IDLER MOUNTING MECHANISM AND TRACK ADJUSTER

BACKGROUND OF THE INVENTION

This invention relates to idler mounting means on a track-type tractor, and more particularly, to such mounting means which comprise means in slidable engagement with the track frame of the tractor.

Track-type vehicles commonly have on either side thereof an idler rotatably secured to a member which is slidably mounted on the forward end of a track roller frame, with the slidable member being associated with a recoil mechanism which permits the slidable member and idler to move rearwardly should the track tension become too great. In addition, there may be track tensioning means associated with such slidable member and track roller frame. (See, for example, U.S. Pat. No. 2,511,098 to Bridwell et al., U.S. Pat. No. 2,683,064 to Land, U.S. Pat. No. 2,887,342 to Helsel, U.S. Pat. No. 2,959,451 to Weber, U.S. Pat. No. 3,477,766 to Linsay, and U.S. Reissue No. 24,126 to Henderson.)

It is always desirable, of course, to improve the design of such systems in, for example, a sliding relation of the slidable member with the track frame, for smoothness, stability, and economy, and as a further example, the sealing system of the track adjuster in the case of the use of fluid for tensioning the track. The present invention seeks to so improve on the prior art devices.

Of more general interest in this area are U.S. Pat. No. 2,811,397 to Cline, and U.S. Pat. No. 3,486,419 to Linkin.

SUMMARY OF THE INVENTION

It is an object of this invention to provide, in a tractor having track frames with idler mounting means slidably associated therewith, a positive system for properly supporting said sliding members, meanwhile allowing smoothness of operation thereof.

It is a further object of this invention to provide, in such tractor a track tensioning system in which proper and efficient sealing means for fluid used for such tensioning are incorporated.

Broadly stated, the invention is in a tractor, and is in combination with a pair of track assemblies associated with the tractor, one disposed on either side thereof. Each track assembly comprises a track frame comprising the first and second generally parallel box-like elongated beams of rectangular cross-section. A slidable member is associated therewith, and comprises a top portion extending across the top portions of the rectangular beams, a first downwardly extending portion extending from the top portion along the inner side of the first beam, a first outwardly extending portion extending from the first downwardly extending portion and along the bottom side of the first beam, and a second downwardly extending portion extending from the top portion along the outer side of the first beam. Further included are a third downwardly extending portion extending from the top portion along the inner side of the second beam, a second outwardly extending portion extending from the third downwardly extending portion and along the bottom side of the second beam, and a fourth downwardly extending portion extending from the top portion along the outer side of the second beam, to provide positive placement of the slidable member, meanwhile allowing sliding of the slidable member along the first and second beams. A first rotatable member is mounted on the slidable member and is movable therewith. A second rotatable member is fixed relative to the track frame, and a track is disposed around and in engagement with the first and second rotatable members. Resilient means are associated with the track frame and slidable member for allowing recoil of the first rotatable member toward the second rotatable member, against the resiliency thereof.

Brief Description of the Drawings

These and other objects of the invention will become apparent from the study of the following specification and drawings, in which:

FIG. 3 is a sectional side elevation of the track tensioning and recoil system of the invention; and, FIG. 4 is a sectional view taken along the line IV—IV of FIG. 3.

Description of the Preferred Embodiment

Figure 1:
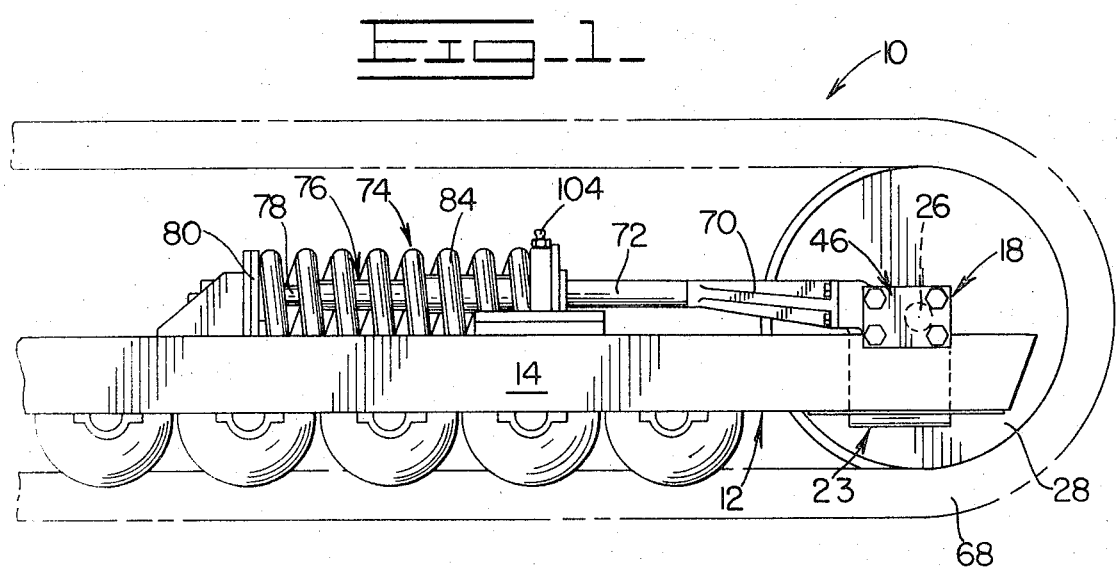
FIG. 1 is a side elevation of a track assembly of a tractor, such track assembly incorporating the invention.
Figure 2:
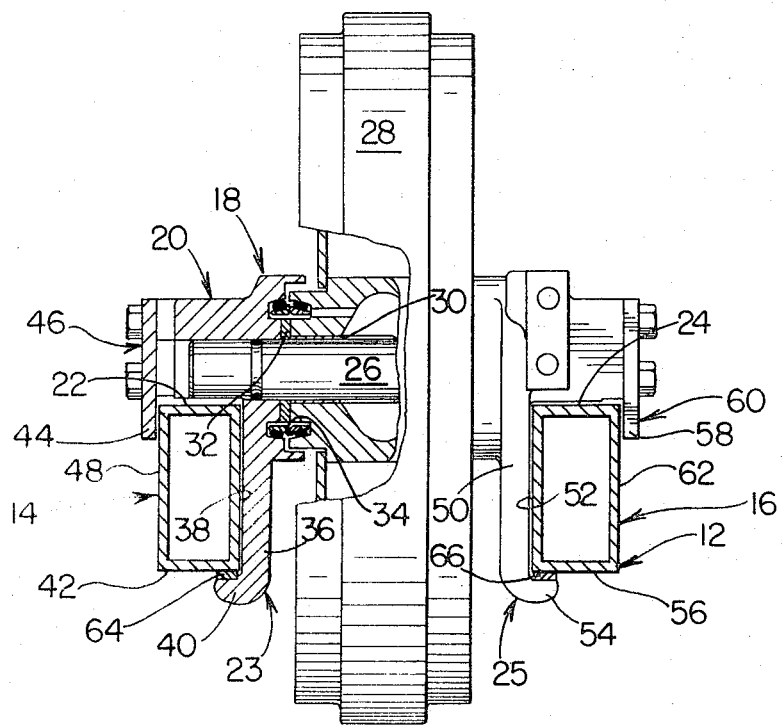
FIG. 2 is a front elevation, partially in section, of the yoke and track frame system of the invention.

As shown in FIGS. 1 and 2, a pair of track assemblies 10 (one shown) are associated with a tractor and disposed on either side of the tractor. Track assembly 10 includes a track frame 12 made up of generally parallel box-like elongated beam members 14,16 of rectangular cross-section. The track frame 12 is mounted to the tractor as is well known.

A slidable member 18 is associated with the track frame 12, as shown in FIG. 2. Slidable member 18 is made up of a top portion 20 which extends across the top machined portions 22,24 of the beams 14,16. The top portion 20 of the slidable member 18 is made up of the top portions of mounting brackets 23,25 which are interconnected by a shaft 26. Shaft 26 has an idler 28 mounted thereon, by means of a bearing 30, to allow free rotation of the idler 28 about shaft 26. Thrust bearing 32 and seal 34 are included as shown.

Extending from the top portion 20 is a downwardly extending portion 36 which extends along the inner side 38 of the beam 14. An outwardly extending portion 40 extends from downwardly extending portion 36 and along the bottom side 42 of the beam 14. Another downwardly extending portion 44 comprises a plate 46 removably fixed to the bracket 23 at the top portion thereof and extending along the outer side 48 of the beam 14. A portion 50 extends downwardly from the top portion 20 along the inner side 52 of the beam 16. An outwardly extending portion 54 extends from downwardly extending portion 50 and along the bottom side 56 of the beam 16. Another downwardly extending portion 58 comprising a plate 60 removably fixed to the bracket 25 at the top portion thereof, extends along the outer side 62 of the beam 16.

A hardened wear strip 64 is disposed between the outwardly extending portion 40 and the bottom side 42 of the beam 14 and fixed to the bottom side 42, and a hardened wear strip 66 is disposed between the outwardly extending portion 54 and the bottom side 56 of the beam 16 and fixed to such bottom side 56.

Through such means, positive placement of slidable member 18 is provided, meanwhile allowing sliding of the member 18 along the beams 14,16. Vertical and lateral movement of the slidable member 18 relative to the track frame 12 are prevented through such means.

A second rotatable member (not shown) is fixed relative to the track frame 12 toward the rear thereof, and a track 68 is disposed around and in engagement with the idler 28 and second rotatable member, as is well known. Fixed to the slidable member 18 by means of bolts is a yoke 70, which is fixed to the forward end of the rearwardly extending piston 72.

A recoil and track tensioning system 74 of the invention is shown in detail in FIGS. 3 and 4. Such system 74 includes a cylinder 76 having a shaft 78 fixed therewithin and extending rearwardly thereof. Such shaft 78 extends slidably through a reaction member 80 fixed to the track frame 12. The cylinder 76 defines a flange 82, and a resilient helical spring 84 is disposed between the reaction member 80 and the flange 82. The shaft 78 defines a rearward wall 86 fixed within the cylinder 76, and the piston 72 extends rearwardly into the cylinder 76, the piston 72, wall 86, and cylinder 76 defining a chamber 88. An annular groove 90 is formed on the inner surface of the cylinder 76 adajcent the flange 82. A pair of longitudinal grooves 92,94 are formed on the inner surface of the cylinder 76, each interconnecting the annular groove 90 with the chamber 88. Threaded passages 96,98 extend through flange 82, and intersect with annular groove 90. Each passage intersects with a discharge port 100 which opens to the front face of the flange 82. A relief valve 102 and a fill valve 104 are threadably disposed in the threaded passages 98,96 respectively and seat against valve seats formed in the threaded passages 98,96. The cylinder 76 is actually made up of a cylinder body 106 and an end cap 108 removably bolted thereto. The cylinder body 106 defines an annular step portion 110 into which is disposed an annular sealing ring 112. The end cap 108 defines an annular extended portion 114 sized to fit partially into the annular step portion 110 when the end cap 100 is so fixed to the cylinder body 106, to retain the seal 112 therein as shown. A seal 116 is disposed in an annular recess 118 formed on the forward side of end cap 108.

In the operation of the system, if the track 68 has become loose, due to wear in the bushings or pins thereof, a substantially incompressible fluid, such as grease, may be selectively introduced through the fill valve 104, through annular groove 90 and grooves 92,94, and into the chamber 88 to act on the end of the piston 72 to move the piston 72 outwardly, or forwardly of the cylinder 76, to in turn move idler 28 forwardly to tension the track 68.

In such system, it should be noted that the seals 112,116 are positioned adjacent the forward end of the cylinder 76 for sealing against the periphery of the piston 72 to insure constant lubrication and protection for the load bearing portion of the adjuster system. In addition, with seal 112 retained by extending portion 114 on end cap 108, the pressure in cylinder 76 is released as the end cap 108 retaining bolts are removed, thus adding to the safety of the device.

During operation of the vehicle, should the track 68 hit an obstruction, or should an object become lodged between the track 68 and the idler 28, the slidable member 18 is forced rearwardly against the resiliency of the spring 84. Outwardly extending members 40,54 slide on the wear strips 64,66, with the downwardly extending portions of 36,50, outwardly extending portions 40,54, and downwardly extending portions 44,58 maintaining the slidable member 18 in proper alignment relative to the track frame 12. When the object is dislodged from the track 68, expansion of the compressed spring 84 forces the slidable member 18 and idler 28 forwardly to their original positions.

What is claimed is:

1. In a tractor, a pair of track assemblies associated therewith, one disposed on either side thereof, each track assembly comprising:
   a track frame comprising first and second generally parallel box-like elongated beams of rectangular cross-sections;
   a slidable member comprising a top portion extending across the top portions of the rectangular beams, a first downwardly extending portion extending from the top portion and along the entire inner side of the first beam, a first outwardly extending portion extending from the first downwardly extending portion and along the bottom side of the first beam, and a second downwardly extending portion extending from the top portion along the outer side of the first beam, and a third downwardly extending portion extending from the top portion along the entire inner side of the second beam, a second outwardly extending portion extending from the third downwardly extending portion and along the bottom side of the second beam, and a fourth downwardly extending portion extending from the top portion along the outer side of the second beam, to provide a positive placement of the slidable member while allowing sliding of the slidable member along the first and second beams;
   a first rotatable member mounted on the slidable member and movable therewith;
   a second rotatable member fixed relative to the track frame;
   a track disposed around and in engagement with the first and second rotatable members; and,
   resilient means associated with the track frame and slidable member for allowing recoil of the first rotatable member toward the second rotatable member, against the resiliency thereof.

2. The tractor of claim 1 and further comprising first wear strip means disposed between the first outwardly extending portion and the bottom side of the first beam, and second wear strip means disposed between the second outwardly extending portion and the bottom side of the second beam.

3. The tractor of claim 2 wherein the second and fourth downwardly extending portions are removable portions of the slidable member.

4. The tractor of claim 1 and further comprising track tensioning adjustment means comprising a cylinder movable along the track frame and having a rearward wall fixed therein, a piston extending rearwardly from the slidable member and into the cylinder, the piston, rearward wall, and cylinder defining a chamber, a rearward reaction member fixed relative to the track frame, resilient means comprising a helical spring disposed between the reaction member and a forward flange portion defined by the cylinder, and means for selectively introducing substantially incompressible fluid into said chamber to move the piston outwardly and forwardly of the cylinder, to thereby tension the track.

5. The tractor of claim 4 and further comprising seal means associated with the cylinder adjacent the forward end of the cylinder, into which forward end the piston extends rearwardly from the slidable member, said seal means being in contact with the periphery of the piston.

6. The tractor of claim 5 wherein the cylinder comprises a cylinder body and an end cap removably fixed thereto, with the cylinder body defining an annular step portion, with the seal means comprising an annular sealing ring disposed in the annular step portion, and wherein the end cap defines an annular extended portion sized to fit partially into the annular step portion when the end cap is so fixed to the cylinder body.

* * * * *